United States Patent Office 3,163,282
Patented Dec. 29, 1964

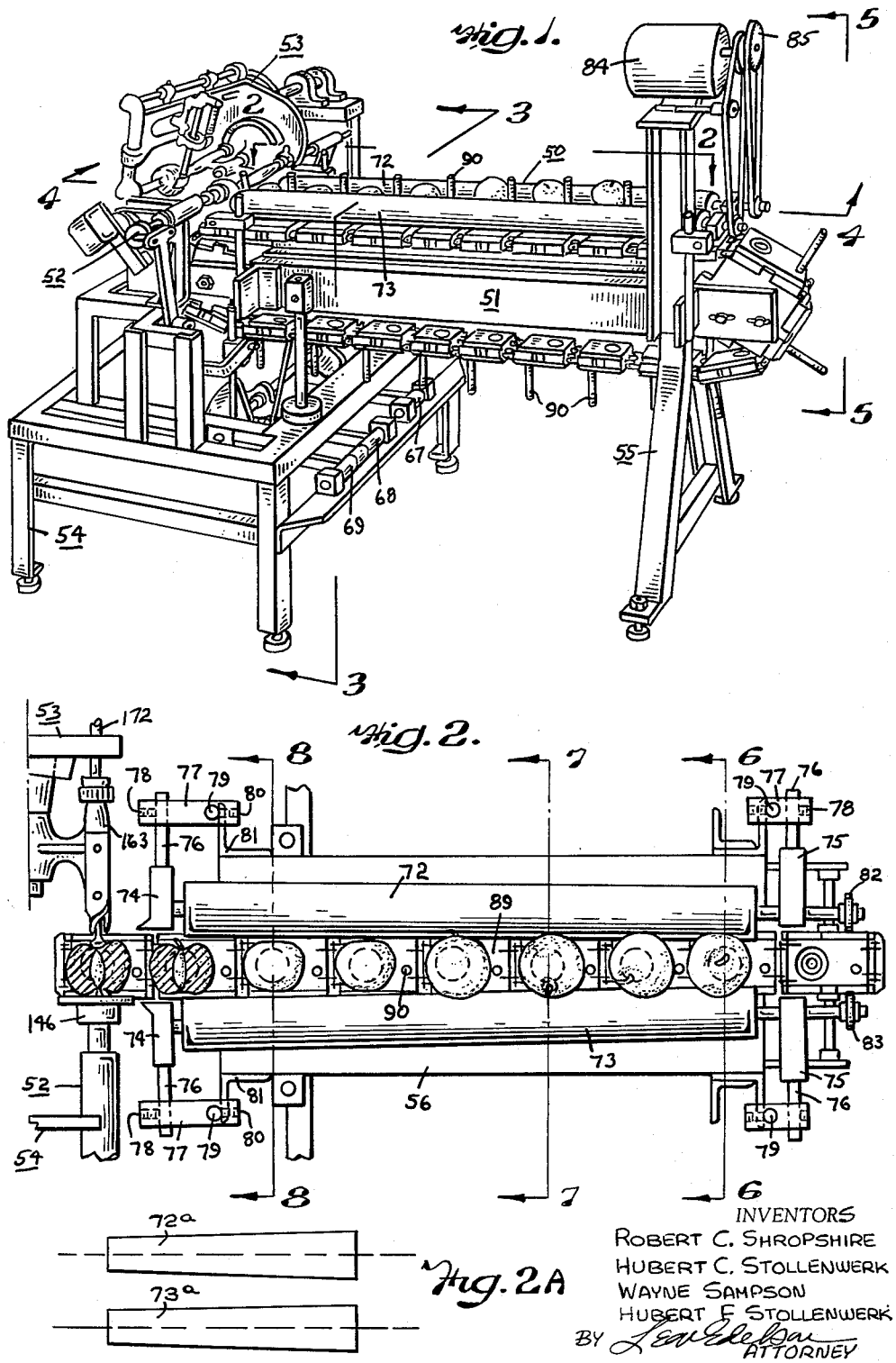
Dec. 29, 1964   R. C. SHROPSHIRE ETAL   3,163,282
APPARATUS FOR AND METHOD OF FEEDING APPLES
FOR CORING AND PEELING THEREOF
Filed Jan. 30, 1963   7 Sheets-Sheet 1
INVENTORS
ROBERT C. SHROPSHIRE
HUBERT C. STOLLENWERK
WAYNE SAMPSON
HUBERT F. STOLLENWERK
BY
ATTORNEY Dec. 29, 1964    R. C. SHROPSHIRE ETAL    3,163,282
APPARATUS FOR AND METHOD OF FEEDING APPLES
FOR CORING AND PEELING THEREOF
Filed Jan. 30, 1963    7 Sheets-Sheet 2
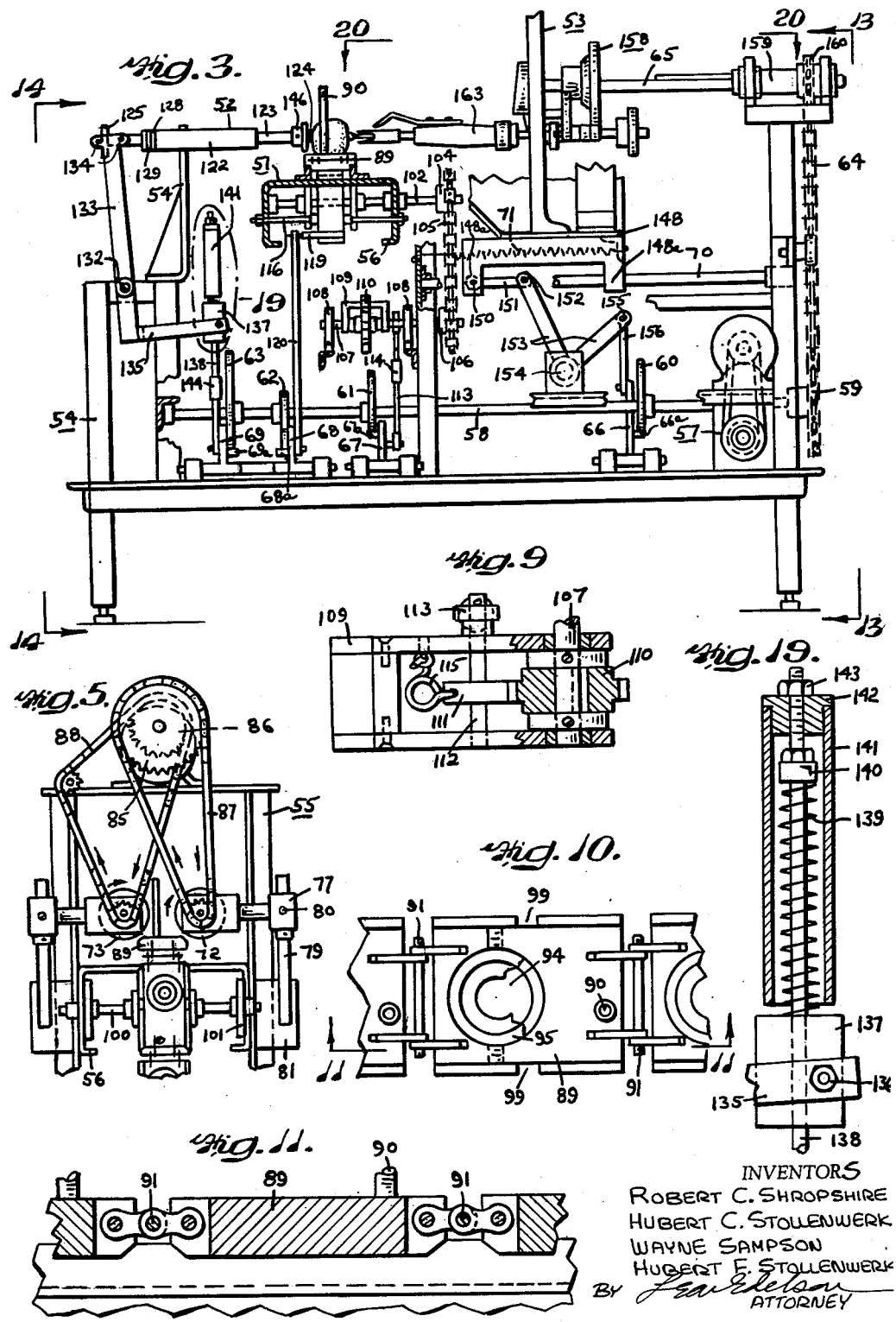
INVENTORS
ROBERT C. SHROPSHIRE
HUBERT C. STOLLENWERK
WAYNE SAMPSON
HUBERT E. STOLLENWERK
BY
ATTORNEY

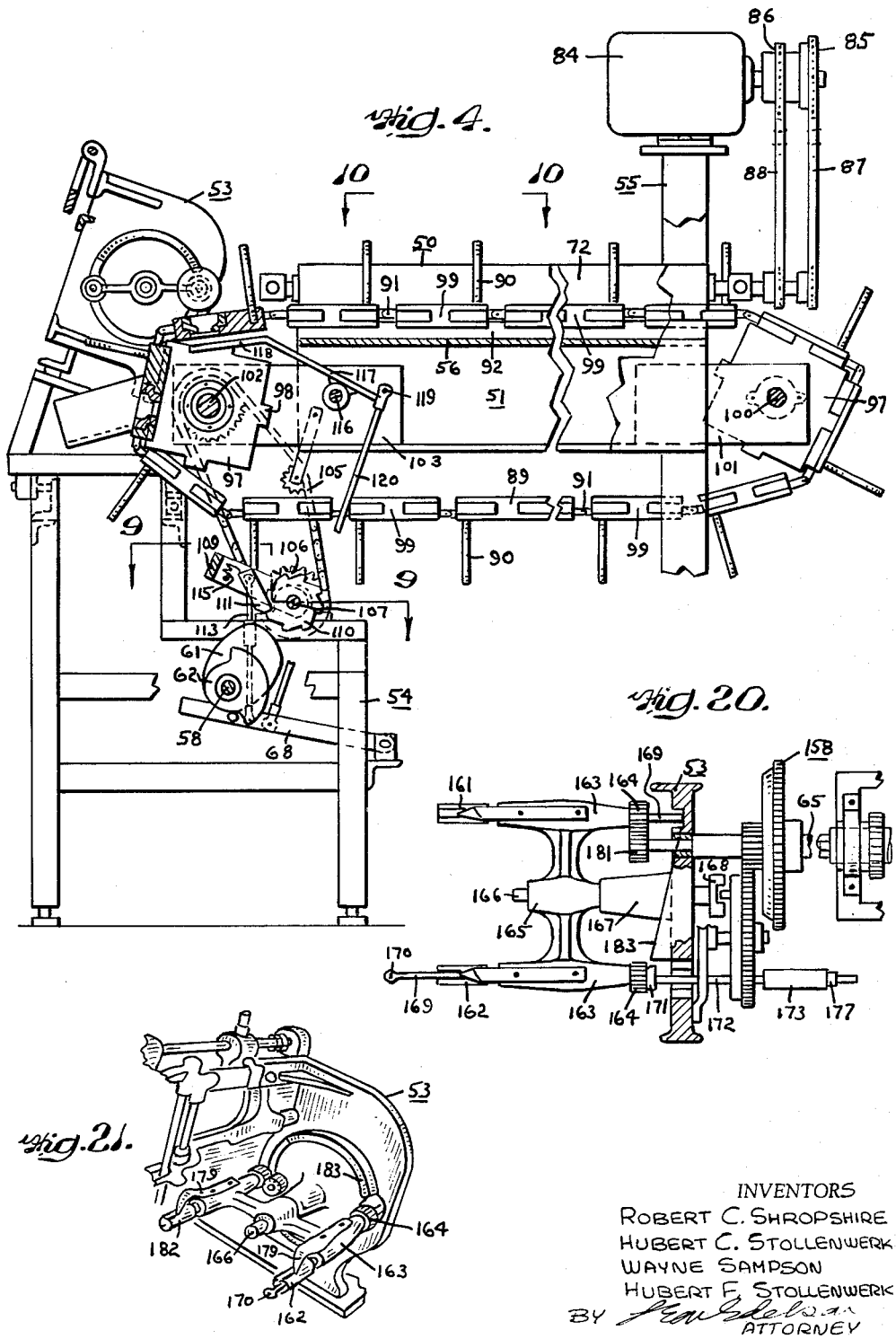

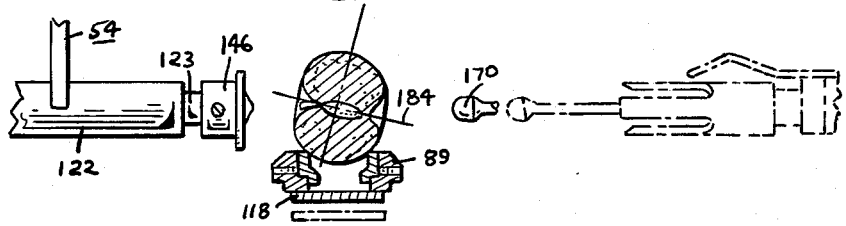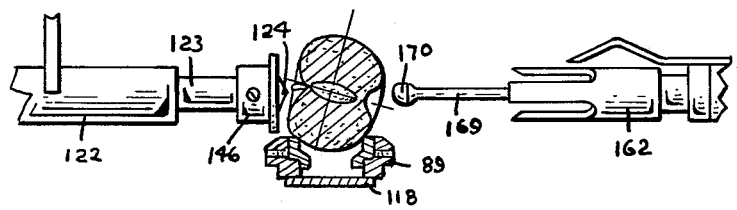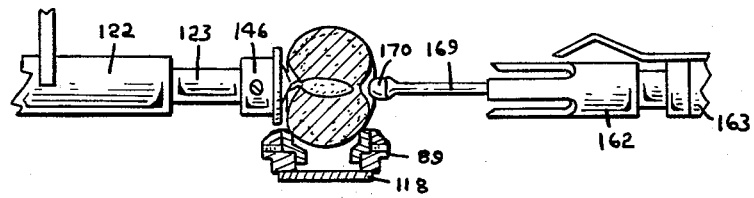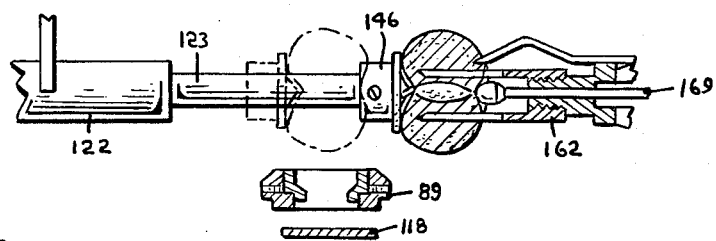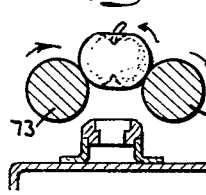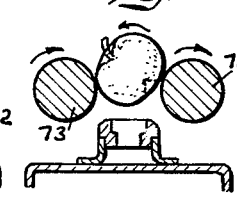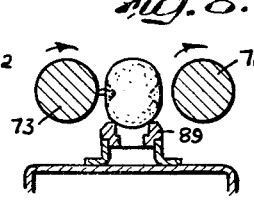

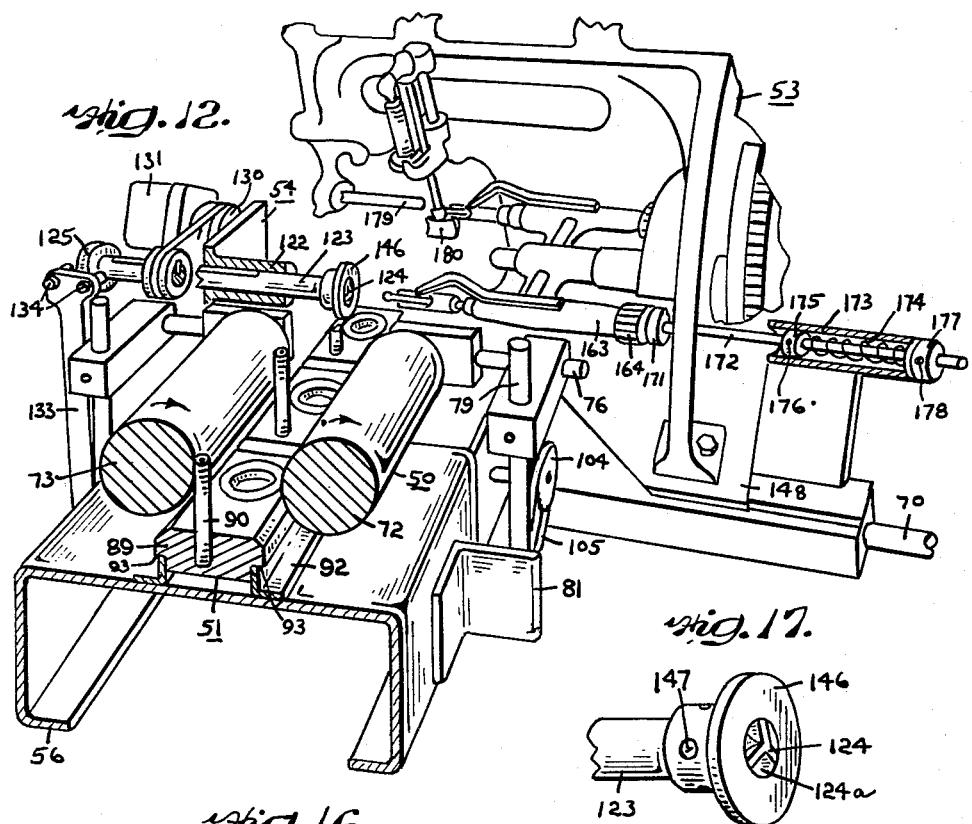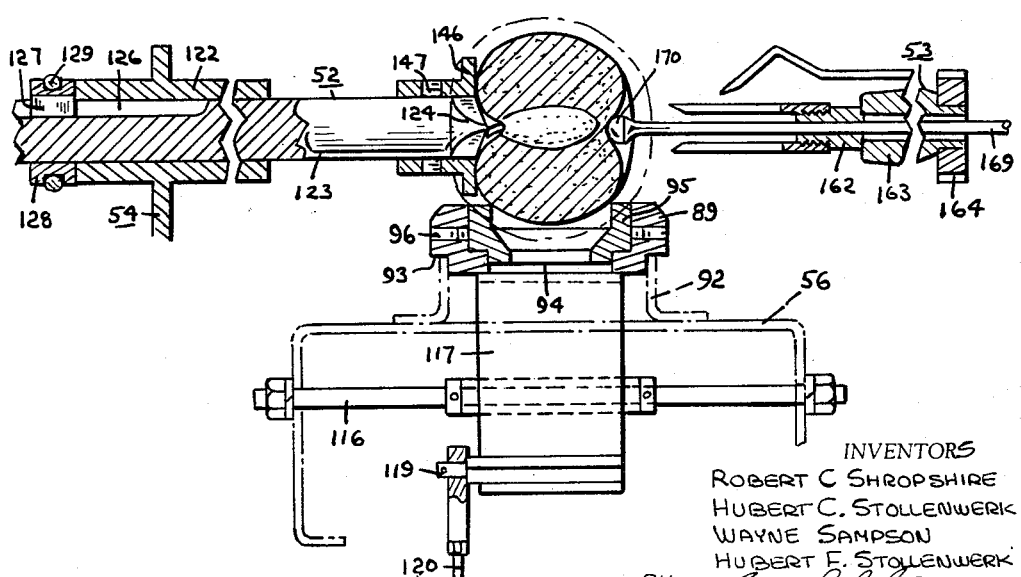

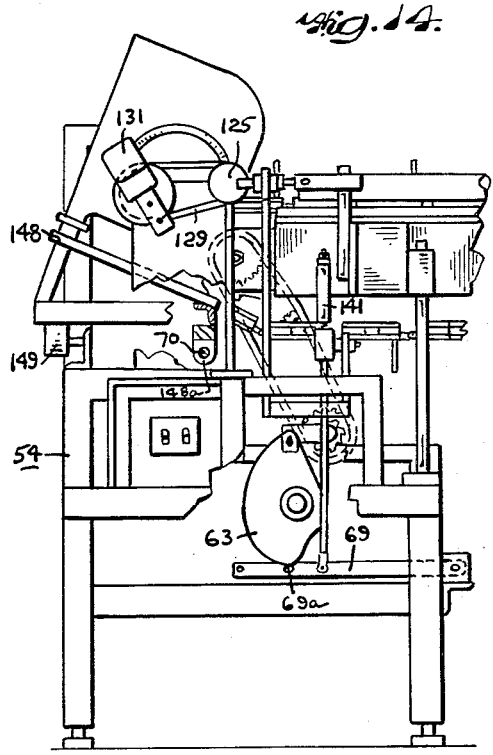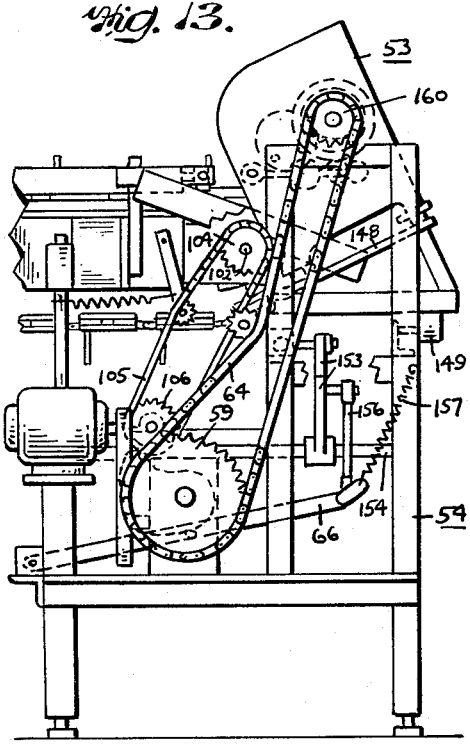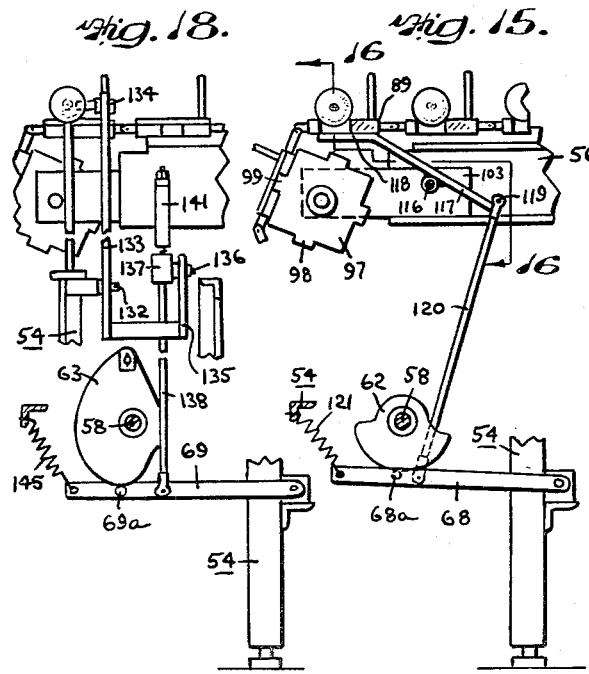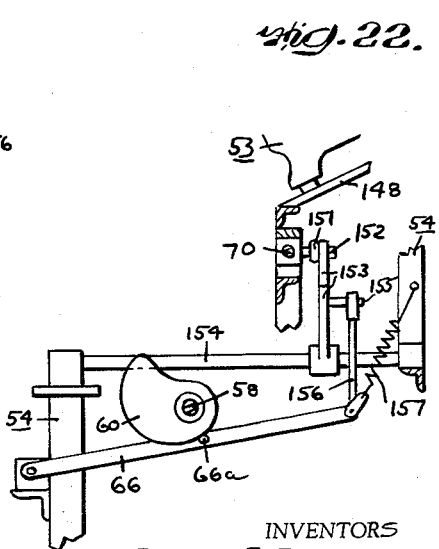

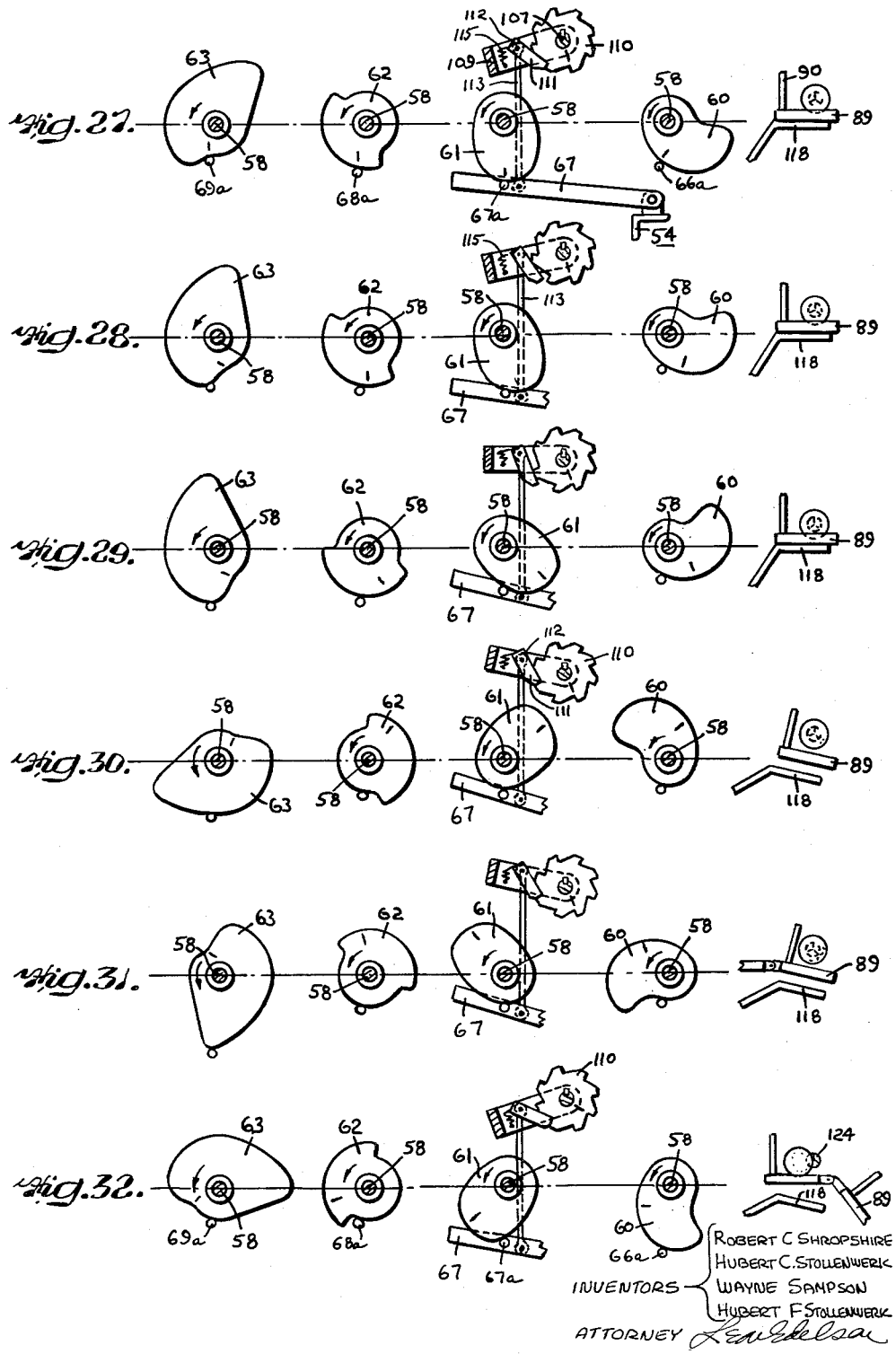

3,163,282
APPARATUS FOR AND METHOD OF FEEDING APPLES FOR CORING AND PEELING THEREOF
Robert C. Shropshire, Vineland, Hubert C. Stollenwerk, Egg Harbor, Wayne Sampson, Lower Bank, and Hubert F. Stollenwerk, Egg Harbor, N.J., assignors to Shropshire, Sampson & Stollenwerk, Inc., Egg Harbor, N.J., a corporation of New Jersey
Filed Jan. 30, 1963, Ser. No. 255,121
22 Claims. (Cl. 198—33)

This invention relates generally to a peeling and coring machine for fruit, and more particularly to a machine for automatically successively feeding apples into a peeling and coring device to prepare the same for slicing, cooking and other uses.

Peeling and coring machines per se are not new but have been known and used for many years. Originally, peeling and coring machines had to be loaded by hand with each apple being individually placed in the proper position for subsequent peeling and coring by the then known devices. Hand loading was generally found to be undesirable because the cores of apples are not uniformally oriented relative to the edible part of the fruit, which fact established an upper limit to the rate at which apples could be properly loaded when taking into account the variability of core positioning. Any attempt to significantly increase production resulted in a rapid increase in the number of peeled and cored apples which had to be rejected because of improper coring due to misorientation of the apple by the person feeding the same to the coring and peeling machine. This situation has represented a serious problem to the fruit canning industry because processing cost reduction has been significantly impeded by the inability to successfully increase the man-hour rate of production of properly cored and peeled apples.

Attempts have been made to devise machinery for properly orienting apples at a high rate of speed and feeding the same into a coring and peeling device. Unfortunately, the devices which evolved are subject to numerous disadvantages such as too slow a rate of production, inability to successfully operate with apples of varying size, high cost of acquisition and/or maintenance, and relatively low yield due to improper positioning for coring resulting in relatively high percentages of rejection. Accordingly, it is a primary object of our invention to provide a novel apparatus for automatically orienting apples and feeding the same to a peeling and coring machine with the core oriented for complete removal thereof irrespective of irregularities in the shape of the fruit.

Another object of this invention is to provide a novel apparatus for receiving randomly oriented apples and shifting the same into a predeterminedly oriented position and transporting the properly oriented apples to a loading station for loading the same into the peeling and coring device.

A further object of this invention is to provide a novel apparatus for peeling and coring apples as aforesaid including means which automatically compensate for variation in size of apples being handled within a predetermined range, and further including adjustment means capable of accommodating for apple sizes lying out of the pre-set operating range of the apparatus.

A further object of this invention is to provide a novel automatic apple peeling and coring apparatus including a novel apple orienting device capable of receiving randomly oriented apples and placing the same with the stem-blossom axis in a predetermined orientation for presentation to a feeding mechanism.

Yet another object of this invention is to provide a novel apple peeling and coring apparatus which includes an apple conveying mechanism operating in conjunction with the orienting device to receive each oriented apple, mechanically stabilized in its oriented position and thereafter carry the apple to the peeling and coring portion of the apparatus for delivery thereto.

Another object of the invention is to provide a novel apple peeling and coring machine which operates automatically as aforesaid in which the various sections of the apparatus function in a synchronized manner through the controlling agency of a primary drive and cam shaft arrangement, and which is relatively small in size, reliable in operation and operable at high rates of yield.

The foregoing and other objects of this invention will become clear from a reading of the following specification in conjunction with an examination of appended drawings, wherein:

FIGURE 1 is a perspective view of the entire apparatus according to the invention;

FIGURE 2 is a plan view of the orienting and conveying part of the apparatus as would be seen when viewed along the line 2—2 of FIGURE 1;

FIGURE 2A illustrates diagramatically the use of tapered rollers instead of the cylindrical rollers shown in FIGURE 2;

FIGURE 3 is a vertical sectional view taken through the apparatus of FIGURE 1 orthogonally to the apple conveyor structure as would be seen when viewed along the line 3—3 of FIGURE 1;

FIGURE 4 is a vertical sectional view on an enlarged scale taken centrally through the apple conveying mechanism as would be seen when viewed along the line 4—4 of FIGURE 1;

FIGURE 5 is an end elevational view looking into the input end of the apple conveyor and orienting apparatus as would be seen when viewed along the line 5—5 of FIGURE 1;

FIGURES 6, 7 and 8 are cross-sectional views taken through the apple orienting and conveying section of the apparatus at successively spaced apart points along the path of travel of an apple, as would be seen when viewed along the lines 6—6, 7—7 and 8—8 respectively of FIGURE 2;

FIGURE 9 is an enlarged fragmentary plan view, partially in section, of a part of the apple conveyor drive mechanism as would be seen when viewed along the line 9—9 of FIGURE 4;

FIGURE 10 is an enlarged fragmentary view from above of the apple carrier structure of the conveyor mechanism as would be seen when viewed along the line 10—10 of FIGURE 4;

FIGURE 11 is an enlarged vertical sectional view through the apple carrier of FIGURE 10 as would be seen when viewed along the line 11—11 of FIGURE 10;

FIGURE 12 is an enlarged fragmentary perspective view of a portion of the apple conveying mechanism, the mechanism for apple core centering, and the peeling-coring apparatus;

FIGURES 13 and 14 are opposite end elevational views of the apparatus of FIGURE 1 as would be seen when viewed along the lines 13—13 and 14—14 respectively of FIGURE 3;

FIGURE 15 is a showing of the cam operated mechanism for dropping the carrier block away from its associated apple when the latter has been firmly grasped for the coring and peeling operations;

FIGURE 16 is an enlarged view through a properly positioned and grasped apple and the mechanism which effects such as would be seen when viewed along the line 16—16 of FIGURE 15;

FIGURE 17 is a fragmentary perspective view of the adjustable spinning head seen in cross-section in FIGURE 16 which grasps one end of the oriented apple;

FIGURE 18 is a similar type of showing to that of FIGURE 15 but with respect to the cam actuated mechanism for shifting the spinning head toward and away from an apple;

FIGURE 19 is an enlarged fragmentary view of a portion of the spinning head control apparatus shown partially in section and partially in elevation, and corresponds to that part of the apparatus shown within the phantom ellipse designated 19 of FIGURE 3;

FIGURE 20 is a simplified plan view of the peeler-corer carriage mounted mechanism as would be seen when viewed along the line 20—20 of FIGURE 3;

FIGURE 21 is a fragmentary perspective view of the peeler-corer mechanism of FIGURE 20 as would be seen when viewed from the left end and a somewhat elevated position;

FIGURE 22 is a fragmentary simplified view of a cam actuated structure for shifting the peeler-corer carriage during the appropriate interval in the cycle of operation;

FIGURES 23 through 26 illustrate successive steps in the grasping of the conveyor held fruit and transferring the same from the conveyor to the peeler-corer apparatus; and FIGURES 27 through 32 illustrate substantially one rotation of the cam shaft upon which the cams are secured which control the synchronized operations of the conveying mechanism, centering head, peeler-corer carriage and carrier block drop mechanism, and illustrate one complete operating cycle of the apparatus according to the invention.

In the several figures, like elements are denoted by like reference characters.

The apparatus according to the invention will be most clearly understood by first understanding the sequence of operations carried out in the processing of an individual apple, from beginning to end, by then understanding how each phase of the processing is carried out, and finally by integrating the various operations into a synchronized whole cycle of operation. By treating the apparatus in this fashion it is not necessary that an understanding of the entire processing structure be gained at one time. As the operation of each functional part of the total apparatus becomes clear, the overall or system operation will emerge naturally and of itself and render readily understandable the synchronized operation of the entire apparatus.

The problem which the apparatus is designed to solve is that wherein a mass of randomly oriented apples may be placed in a supply bin or hopper and after a suitable time interval, preferably as short as possible, the apples will emerge from the processing apparatus in a completely peeled and cored condition. If it is desired to use a standard type of apple peeling and coring machine, as for example made by the Boutell Manufacturing Company and known as a Boutell apple peeling and coring machine, or a Ferrum apple peeling and coring machine (made in Switzerland) which is substantially the same as the aforementioned Boutell machine, both of which are well known to the apple processing industry, it is required that the apples to be peeled and cored be presented to the processing machine at a particular point with a particular orientation and at a particularly determined rate. In order to carry out this program it is necessary to take into account the operating cycle of the Boutell or Ferrum type of machine and to integrate the remainder of the apparatus therewith so that a synchronized operation is achieved.

The apparatus according to the present invention achieves this purpose by first taking the randomly oriented apples from the supply source and successively individually orienting the apples therefrom and depositing the so oriented apples onto a conveyor mechanism, then actuating the conveyor mechanism to move the apples successively into a pre-determined position with respect to the peeler-corer mechanism where additional apparatus picks up the oriented apples, aligns the same precisely and delivers the apples to the peeler-corer. This process is continuously repeated so long as there remains a supply of apples being fed to the apparatus. From the foregoing, it will be appreciated that the apparatus breaks down into several sections which may be examined substantially independently although all working together in a synchronized manner. These sections are and will be considered in the following order:

1. General Organization
2. Orienting
3. Conveying
4. Core Centering and Peeling-Coring

1. GENERAL ORGANIZATION

*(FIGURES 1 to 3 and 12)*

From FIGURES 1, 2, 3 and 12 it is observed that the several sections of the machine are designated as the orientor 50, conveyor 51, spinning head 52 and peeler-corer 53, the latter two sections being mounted on a framework designated as 54 while the orientor 50 and conveyor 51 extend substantially at right angles to the frame 54, having the output end thereof secured to the framework 54 and being supported at the input end by an upstanding trusswork designated generally as 55. Extending between the framework 54 and truss 55 and fixedly intersecuring the same is a generally C-shaped channel member 56, best seen in the showing of FIGURE 12, over which the conveyor structure 51 rides and which also supports a part of the bearing structure for the roller orientor 50. As best seen in FIGURE 3, the framework 54 carries a primary drive 57 which rotates a cam shaft 58 upon which are fixedly secured a sprocket 59 and four cams 60, 61, 62 and 63 which control and synchronize the operation of the various portions of the apparatus. The sprocket 59 provides motive power for the operation of the peeler-corer 53 through the drive chain 64 and spline shaft 65 while the cams 60 through 63 control the motions of the conveyor 51, spinning head 52 and peeler-corer 53 through crank arms and cam followers designated respectively as 66 through 69 and 66a through 69a.

The cam 60 and crank arm 66 operate through a pivoted linkage system to axially shift the entire peeler-corer 53 to the right along the shaft 70 carried by the frame 54 at the appropriate point in the operating cycle, the carriage-mounted peeler-corer 53 being returned to its illustrated position in FIGURE 3 by means of a spring arrangement 71 secured between the carriage and the frame 54. The cam 61 and crank arm 67 operate through an appropriate linkage to step the conveyor 51 and bring the next successive apple into proper position for transfer to the peeler-corer. The cam 62 and crank arm 68 operate through a linkage to disengage the conveyor 51 from an apple which has been grasped for delivery to the peeler-corer. Finally, the cam 63 and crank 69 operate through a linkage system to control the motion of the spinning head 52 which cooperates with a centering finger part of the peeler-corer mechanism to exactly center the core and thereafter transfer the apple onto a set of holding fork tines of the peeler-corer for the final processing. Understanding now the general organization of the apparatus, attention will first be directed to that portion of the invention concerned with initially orienting the fruit for proper presentation to the peeler.

2. ORIENTING

*(FIGURES 1, 2, and 4 to 8)*

The orientor consists of a pair of cylindrical rollers 72 and 73 journalled for rotation in bearing blocks 74 and 75, the blocks 74 being those positioned closest to the peeler-corer mechanism 53 while the bearing blocks 75 are those more remotely positioned at the end of the orientor where the apples are loaded. Each of the bearing blocks has affixed thereto and extending laterally outward therefrom a shaft 76 close-fittingly slidably passing through a block 77 and secured in desired position by means of a locking screw 78. Also slidably projected vertically through each of the blocks 77 is a shaft 79 secured in a particularly vertically adjusted position by means of a locking screw 80, the lower end of each of the shafts 79 being fixedly secured to an angle bracket 81 which is in turn secured to the C-shaped channel member 56 which supports the conveyor 51.

As is most clearly seen in the showing of FIGURE 2, the lateral spacing between the rollers 72 and 73 is adjustable by means of the endwise shifting of the shafts 76 and position locking through locking screws 78. Similarly, as best seen in the showing of FIGURE 5, the rollers 72 and 73 are vertically shiftable by vertically adjusting the blocks 77 and locking their position by means of locking screws 80. The rollers are adjusted so that their axes are substantially or approximately in a common plane and divergingly oriented so that the space between the rollers is somewhat greater at the peeler-corer end than it is at the apple input end. Moreover, the plane of the rollers will normally be inclined somewhat downwardly in the direction of apple motion, that is, toward the peeler-corer apparatus.

Alternatively to the cylindrical rollers 72 and 73, tapered rollers could also be utilized as for example shown diagramatically in FIGURE 2A as 72a and 73a. The axes of the tapered rollers 72a and 73a, as designated by the dashed lines, are observed to be parallel so that it is apparent that the divergence characteristic of the roller surfaces from input end to output end may be effected by the utilization of cylindrical rollers with divergingly oriented axes or by the use of tapered rollers with parallel axes. Tapered rollers may also be used with diverging or converging axes in the event that the degree of taper of the roller surfaces is considered to be respectively too little or too much in a particular case.

The rollers 72 and 73 are simultaneously rotatably driven, preferably, for example, by means of the sprockets 82 and 83 fixed upon the roller shafts which project beyond the bearing blocks 75, each sprocket being driven from an electric motor 84 secured to the truss 55. The motor 84 is provided with a large sprocket 85 and a smaller sprocket 86 commonly mounted upon its rotor shaft, the larger sprocket 85 driving the sprocket 82 of roller 72 through a chain 87 while the smaller sprocket 86 drives the sprocket 83 of roller 73 by means of the chain 88. Since the roller sprockets 82 and 83 are observed to be of the same size it will be apparent that the roller 72 is rotatably driven at a higher rate of speed than is the roller 73 since the driving sprocket 85 is larger than the driving sprocket 86 and both of these driving sprockets are driven at the same rate of speed by the motor 84. Typically, the rollers 72 and 73 may be respectively driven at approximately 120 and 60 revolutions per minute.

From the showing of FIGURE 5 it is also clear that both of the rollers 72 and 73 are rotated in the same sense so that an object placed between the rollers and of larger diameter than the clear distance therebetween will experience a downward peripheral thrust due to rotation of the roller 73 and an upward peripheral thrust due to the rotation of the roller 72. The higher speed of the roller 73 results in a net upward peripheral thrust which prevents an apple from being drawn down and crushed between the rollers. It is not necessary that the rollers be operated at different speeds if the net peripheral thrust can be maintained as upwardly directed, this aforementioned roller speed difference being utilized when the roller surfaces are for all practical purposes identical. For example, the rollers could be operated at the same speed if the coefficient of surface friction of roller 73 is sufficiently lower than the coefficient of surface friction of roller 72. This could be effected by using a roller 73 having a coating of nylon, Teflon or some other low friction bearing substance.

With this in mind, reference should now be made particularly to the showings of FIGURES 2 and 6 through 8 for an understanding of the orienting process. The orienting of the apples takes advantage of the natural shape of most apples and the force of gravity. As is well known, most apples are shaped so that they are shorter along the stem-blossom axis than transversely thereto, this being shown in the figures. As best seen in FIGURES 2 and 6 this transverse dimension of the apple is sufficiently large to prevent its dropping downward between the rollers 72 and 73 while oriented in the illustrated manner. The rotation of the rollers however does not permit the apple to remain in the position shown in FIGURE 6, but imparts a turning motion to the apple, as best seen in FIGURE 7, which tends to rotate the stem-blossom axis transversely to the roller axes until the apple eventually assumes the orientation shown in FIGURE 8. The orientation of the apple shown in FIGURE 8 permits the apple to drop downward between the rollers 72 and 73 as soon as the space therebetween is sufficiently wide.

As previously mentioned, and as best seen in FIGURE 2, the rollers are divergingly disposed so that each apple may eventually drop downward therebetween at some point along the path of travel when the apple assumes the orientation shown in FIGURE 8. As seen in FIGURES 5 through 8, the carrier blocks 89 of the conveyor 51 ride beneath and between the rollers 72 and 73 and each carry projecting upward therefrom between the rollers a device 90 which is designated as a jostling pin or spring. As will become clear in the following section explaining the operation of the conveyor 51, the carrier blocks 89 move in stepped fashion at fixed intervals in the direction of the peeler-corer. The jostling pin 90 projecting upward from each carrier block 89 is of sufficient height to separate one apple from the next successive apple and so to effectively associate one apple with each such carrier block 89. Should a given apple assume a fixed position relative to the rotation rollers 72 and 73 as for example illustrated in FIGURES 6 and 7, then the next time that the conveyor 51 shifts forward, the jostling pin 90 immediately behind such an apple will bump against the apple and move it out of its undesirably stabilized position by virtue of the fact that such jostling pins or springs are laterally offset relative to the longitudinal center line of the carrier block and strike the associated apple along a line which does not pass through the center of mass of the apple and therefore causes the apple to rotate. This upsets the stabilized conidtion of the apple and allows it to be moved into the desirably oriented position of FIGURE 8.

The proper orienting of the apple by gravity and the roller drive system is materially aided by any agent which reduces the friction between the apple surface and the rollers 72 and 73, and it has been found that wetting the rollers and/or the fruit with ordinary water provides a perfectly satisfactory lubricant. From the foregoing description and the showing of FIGURE 2 in particular it will be appreciated that the randomly oriented fruit introduced to the orienting device 50 is turned and jostled until it assumes, within limits, the specific predetermined orientation shown in FIGURE 8 and is then deposited in a conveyor device for transportation to the apparatus which will carry out peeling and coring. The structure and operation of the conveying device 51 which accepts the apples from the orientor 50 will now be examined.

3. CONVEYING (FIGURES 1 to 5 and 9 to 16)

As best seen in FIGURES 4, 11, 12 and 16 the conveyor 51 includes a plurality of the carrier blocks 89 linked together in chain belt fashion by the links 91 and riding on the tracks 92 which are secured upon the upper surface of channel member 56 in spaced apart parallel relationship, each of the carrier blocks 89 being undercut at its longitudinally extending side edges as at 93 to provide a depending portion therebetween disposable between the tracks 92 which prevents disengagement of the carrier blocks from the tracks.

As best seen in FIGURES 10 and 16, each of the carrier blocks 89 is provided with a suitable well 94 within which large sized apples, as shown in phantom outline in FIGURE 16, are seatable, and each is adapted to removably receive an apertured insert 95, fixable to the carrier block 89 with its well in axial registry with that of the block 89 by means of the locking screws 96, which insert provides proper vertical centering of smaller sized apples as shown in solid outline in FIGURE 16. This is necessary because in the illustrated case the conveyor 51 is vertically fixedly positioned relative to the spinning head 52 and peeler-corer carriage 53. Without the adapter insert 95 the illustrated smaller-sized apple would be vertically lower by a considerable amount and would not then be in proper position for being picked off of the conveyor for delivery to the peeler-corer apparatus. Of course, in lieu of such adapter insert it would be possible to make the entire conveyor structure vertically adjustable relative to the spinning head and peeler-corer 53. The plane of the conveyor 51 is also oriented to diverge slightly downward from the plane of the orientor rollers in the direction of conveyor motion to insure that the centers of the larger apples lie below the rollers' axes when these apples drop onto the conveyor.

As best seen in FIGURES 4, 10 and 15, the articulated carrier blocks 89 constitute an endless loop trained about the sprocket blocks 97 which latter are of square shape and provided with keys 98 projecting laterally thereof and into engagement with the carrier blocks 89 by disposition within suitable keyways 99 formed midway longitudinally of the carrier block sides. The sprocket blocks 97 at the input end of the conveyor 51 are mounted upon a shaft 100 journalled at opposite ends through a pair of side plates 101 each of which is physically secured to and longitudinally extend from the sidewalls of the C-shaped channel member 56, this being best seen in the showing of FIGURE 5. Similarly, the sprocket blocks 97 at the opposite end of the conveyor are mounted upon a shaft 102 journalled at opposite sides through a pair of side plates 103 also secured to the sidewalls of the C-shaped channel member 56, the shaft 102 at one end extending completely through the channel member 56 and being fitted laterally thereof with a sprocket 104, as best seen in the showing of FIGURE 3. Trained about the sprocket and extending downward therefrom is a chain 105 also trained about a sprocket 106 at its lower end, the sprocket 106 being secured upon a shaft 107 which latter is journalled in bearings carried by supports 108 secured to the framework 54 of the apparatus. As best seen in FIGURES 3, 4 and 9, the shaft 107 passes through the side arms of the U-shaped bracket 109 with the bracket being freely pivotally carried by the shaft. Disposed between the side walls of the bracket 109 and fixed upon the shaft 107 for rotation therewith is a ratchet 110 the teeth of which are engaged by the free end of a pawl or dog 111 also disposed between the sidewalls of the U-shaped bracket 109 and pivotally carried by a shaft 112 journalled through the bracket sidewalls and having secured to one end thereof the upper end of a downwardly extending tie rod 113 pivotally secured at its lower end to the crank arm 67 and adjustable in length by means of the turnbuckle 114. A spring 115 carried by the bracket 109 constantly urges the free lower end of the pawl 111 into engagement with the teeth of the ratchet 110.

The conveyor 51 is moved continually in a stepped fashion so that a carrier block 89 is brought into proper position for pick-up of the apple carried thereby, pauses while the apple is completely centered and picked off of the carrier block and then moves forward to bring a new carrier block containing an apple into proper position. This stepping of the conveyor 51 is carried out by stepping the shaft 102 upon which are fixed the conveyor sprocket blocks 97, the stepped rotation of shaft 102 being communicated thereto through the chain 105 from sprocket 106 carried by the shaft 107. The sprocket 106 is itself stepped through the agency of the ratchet 110 and the pawl 111 in the manner most clearly seen in the showings of FIGURES 27 through 32, this series of figures illustrating the sequence of synchronized cam motions of the apparatus.

FIGURE 27 shows the stepping action most clearly, illustrating the manner in which the constant speed rotation of the main cam shaft 58 upon which is fixed the cam 61 is converted to a stepped motion at the shaft 107. The bracket 109 being freely pivoted upon the shaft 107 may move up and down in oscillating fashion about the shaft 107 as a consequence of the motion of the tie rod 113 produced by action of cam 61 upon the crank arm 67, without of itself inducing any rotary motion in the shaft 107. However, since the pawl 111 is carried by the bracket 109 it is clear that the lower free end of the pawl shifts upward and downward in accordance with the oscillations of the bracket 109 and is constantly engaged with the toothed surface of the ratchet 110 due to the action of biasing spring 115. Motion of the ratchet 110 is of course transmitted to the shaft 107.

As is most clearly seen in the showing of FIGURE 27 the cam 61 is so rotated that the crank arm 67, and hence tie rod 113, has been pulled downward to its lowest position, causing the bracket 109 to oscillate downward about shaft 107 and carry with it the pawl 111. Since the free end of the pawl 111 is engaged behind one of the teeth of the ratchet 110, the ratchet 110 is also rotated at this time and thereby steps the shaft 107. Examination of FIGURES 28 and 29 shows that the pawl 111 is being backshifted relatively to the ratchet 110 and moved upward as the tie rod 113 moves up due to the rotation of cam 61, until the pawl 111 latches behind the next tooth of the ratchet 110 as seen in FIGURE 30. When cam 61 is again rotated to a position where the tie rod 113 is being pulled downward, as for example in the time interval between the showings of FIGURES 31 and 32, then the pawl 111 again advances the ratchet 110 to move the shaft 107 through another step, the shaft 107 being stepped once for each revolution of the main cam shaft 58. As previously described, the stepped motion of shaft 107 is transmitted through the chain 105 and sprockets 104 and 106 to the shaft 102 which directly rotates the conveyor sprocket blocks 97 to advance the carrier blocks 89.

As is seen in FIGURE 16, the carrier-block-held apple is engaged at opposite ends of the stem-blossom axis by the spinning head 52 and a rounded centering finger member which is part of the peeler-corer 53. As will be made clear in the subsequent section of the specification, when the apple is properly aligned in the manner illustrated in FIGURE 16 the spinning head 52 will shift axially to the right to shift the apple in the same direction onto the tines of the peeler-corer fork 162 as shown in solid line in FIGURE 26. It will be appreciated that it is not possible to shift the apple in the manner shown in FIGURE 26 when the apple is held by the carrier block 89 as in FIGURE 16 because of the interfering position occupied by the carrier block itself. Hence, just before effecting the transfer of the apple to the fork tines of the peeler-corer it is necessary to disengage the apple from the carrier block 89.

Since the position of the apple required for pickup is fixed due to the fixed vertical positions of the spinning head 52 and the peeler-corer 53, disengagement is effected by dropping the carrier block 89 downward to the cleared position also shown in FIGURE 26. The apple of course remains in its properly aligned position because it is held by the spinning head 52 and centering finger of the peeler-corer 53. The mechanism which effects the drop of the carrier block 89 below the apple is most clearly seen in the showings of FIGURES 3, 4, 15 and 16, particular attention being paid to the showing of FIGURE 15. Extending between the sidewalls of the C-shaped channel member 56 and secured thereto is a pivot shaft 116 upon which is secured for pivotal motion thereabout an angularly disposed elongated plate member 117 terminating at its upper forward end in a horizontally disposed shoe 118 and being pivotally connected at its lower end as at 119 to a generally downwardly extending tie rod 120, which latter is pivotally secured at its lower end to the crank arm 68 whose motion is controlled by the cam 62 and upward biasing spring 121.

When the longer radius of the cam 62 is engaged with the cam follower of crank arm 68, as shown in FIGURE 15, the tie rod 120 is at a lower position which causes the plate member 117 to be pivoted about shaft 116 to thereby elevate the shoe 118 and hold the carrier block 89 of the conveyor in its up position as seen in FIGURES 16, 23, 24 and 25. When however the cam 62 rotates into position to cause its smaller radius to be engaged by the cam follower 68a of crank arm 68, then the tie rod 120 is moved into an upper position which causes the plate member 117 to pivot about shaft 116 and lower the shoe 118 in the manner illustrated in FIGURE 4 to thereby lower the carrier block 89 of the conveyor and allow the apple to be moved laterally by the spinning head onto the fork tines of the peeler-corer as shown in FIGURE 26. The sequence of FIGURES 27 through 32 shows the movements of the shoe 118, the first three figures illustrating the shoe in its up position while the last three figures illustrate the shoe in its down position. Understanding now the means employed to deliver a properly oriented apple to a pickup station and release the apple when it has been grasped, attention should now be directed to the apparatus which causes the transfer of the apple to the peeler-corer device.

4. APPLE PICKUP AND TRANSFER

*(FIGURES 1 to 4, 12, 14 and 16 to 22)*

Referring first to FIGURES 3, 12 and 16 which most clearly illustrate the structure of the spinning head 52 arrangement, it is observed that the framework 54 carries in horizontal disposition a hollow cylindrical formation 122 within which is disposed a cylindrical rod 123 which extends axially beyond the hollow formation 122 in both directions and terminates at its inner end proximate the conveyor 51 in a tapered nose 124, while terminating at its opposite or outer end in a disc-like formation 125 of larger diameter than the diameter of the cylindrical rod 123. The cylindrical rod 123 is longitudinally grooved along a line parallel to its axis, as at 126, to provide a keyway within which is disposed a key or spline 127 carried by a collar 128 disposed about the rod 123, the collar 128 being grooved externally to accept a belt 129 trained thereabout and extending rearwardly about a pulley 130 drivable by an electric motor 131.

When the motor 131 is energized, the collar 128 is of course rotated by means of the belt 129 and hence causes the cylindrical rod 123 to rotate therewith by means of the keyed arrangement therebetween. It will also be noted that the keyway 126 is substantially longer than the key 127 of the collar so that the rod 123 is axially shiftable relatively to the collar during rotation thereof. Such axial shifting of the rod 123 is clearly illustrated in the successive FIGURES 23 through 26 and occurs during that portion of the operating cycle in which an apple is picked off of the conveyor 51 and transferred to the fork tines of the peeler-corer 53.

The mechanism which effects this axial shifting of the spinning head 52 is best seen in FIGURES 3, 12 and 18 wherein it is observed that the frame 54 pivotally supports, as at 132, a lever 133 extending upward and downward from the pivot point, the upper end thereof carrying a pair of studs 134 disposed on opposite sides of and engageable with the disc 125 carried by the cylindrical rod 123 to axially shift the rod in response to motion of the lever 133, while the lower end of the lever 133 is rigidly connected to an inwardly extending arm 135 terminating at a pivot connection 136 to a block 137. As best seen in FIGURE 19, the block 137 is vertically apertured to permit the through passage of tie rod 138, about the upwardly projecting end of which tie rod there is disposed a compression coil spring 139 held down against the upper surface of the block 137 by means of a stop nut 140 threaded upon the upper portion of the tie rod 138. Disposed coaxially about the upper end of the tie rod 138 and the spring 139 is a sleeve 141 whose upper end is adjustably secured to the tie rod end by means of a threaded plug 142 and stop nut 143. The length of the tie rod 138 is adjustable by means of the turnbuckle 144, and the lower end of the tie rod is pivotally connected to crank arm 69 whose cam follower 69a is normally biased upwardly against the cam 63 by means of the spring 145 connected between the crank arm and the frame 54.

From the showings of FIGURES 23 through 26 it is apparent that the axial shifting of the cylindrical rod 123 causes the tapered nose 124 to engage in the stem or blossom recess of the apple. While it is desired that the engagement with the apple be sufficient for the tapered nose 124 to grasp the apple, it is not desired that the apple be impaled thereon. In order to prevent such impaling, an adjustable flange 146 is provided which is axially shiftable upon the cylindrical rod 123 and fixable at any desired adjusted point by means of locking screws 147. The flange 146 broadly engages the surface of the apple upon a predetermined degree of penetration of the tapered nose 124, thereafter preventing additional penetration. Preferably, the conical surface of the tapered nose 124 is fluted as at 12a, as shown in FIGURE 17, so that as said nose rotates its surface interruptions act upon the apple to jostle the same into position with its stem-blossom axis in axial alignment with the rod 123.

Since the spinning head 52 and a centering finger portion of the structure of the peeler-corer 53 cooperate in grasping the apple just prior to transfer from the conveyor to the fork tines, it will be most conducive to a complete understanding to at this time examine certain aspects of the peeler-corer 53. From the series of FIGURES 23 through 26 it is clear that at some point in the cycle of operation the peeler-corer 53 shifts first toward the apple to be picked up, assumes a stationary position while the apple is transferred to the fork tines by the spinning head and then retracts to deliver the apple to the peeler-corer devices, and subsequently continuously recycles. The mechanism for effecting this shifting motion of the peeler-corer 53 is best seen in the showings of FIGURES 3, 13, 14 and 22 to which reference should now be made.

The entire peeler-corer 53 is carried on an inclined bed plate 148 the inner end of which is provided with a pair of laterally spaced feet 148a through which is slidably projected the previously described shaft 70, as most clearly shown in FIGURE 14, and the elevated outer end of which is provided with a downward extension which rides upon rollers 149 secured to the rear end of the framework 54. Pivotally secured to the bed plate 148 as at 150 is an arm 151 extending horizontally toward the primary drive end of the apparatus to a point of pivotal connection 152 with the upper end of one arm of a V-shaped crank 153, the crank being pivotable at its vertex by means of a shaft 154 carried by the frame of the apparatus. The free end of the other arm of the V-shaped crank 153 is pivotally connected as at 155 to a depending tie rod 156, the lower end of the tie rod being pivotally connected to crank arm 66. The cam follower 66a of crank arm 66 is biased upward into engagement with the cam 60 by means of the biasing spring 157 connected between the crank arm 66 and the frame 54 and when the crank 153 is biased into its position shown in FIGURE 3, the peeler-corer 53 is in its left shifted position as best seen in the dashed line showing of FIGURE 26 and is about to be right shifted by the continued clockwise rotation of cam 60.

From FIGURE 22 it will be apparent that as the cam 60 rotates clockwise from the position illustrated the crank arm 66 is forced quickly downward, which in turn rotates the V-shaped crank 153 clockwise as seen in FIGURE 3 to thereby rapidly shift the peeler-corer 53 to the right until the point of the cam 60 is passed, after which the carriage begins shifting towards the left at a slower more uniform rate under the urging of the return spring 71. The gearing structure 158 of the peeler-corer 53 is continuously driven during this shifting motion of the entire peeler-corer structure by means of the spline shaft 65 which slips into and out of the drive housing 159 while remaining operatively engaged at all times with the sprocket 160 driven by chain 64.

The peeler-corer 53 itself is a somewhat modified Boutell or Ferrum apple peeling and coring machine, as previously indicated, and operates in the well known manner of these devices. Generally these machines operate as follows, reference being made to FIGURES 1, 4, 12, 20 and 21. The machine includes a pair of parallel spaced apart forks 161 and 162 mounted upon hollow shafts which extend respectively rearwardly rotatably through a pair of housings 163 to a pair of gear wheels 164, the fork shaft housings 163 being fixedly connected in 180° spaced relation to a central hub 165 which is in turn secured to a shaft 166 projected through a bearing 167 and terminating at its rear end in a drive member 168 which engages at a particular time in the cycle with the gearing structure 158 to cause the forks 161 and 162 to revolve about the axis of the shaft 166 and interchange places.

As best seen in FIGURES 16, 20 and 21 extending centrally co-axially through each of the forks is a centering finger rod 169 which terminates at its forward end in an enlarged rounded nib 170. The centering finger rod 169 of the fork 162 extends rearwardly to the rear surface of the gear 164 where it abuts a stop pad 171 affixed to the forward end of a shaft 172 which projects in axial alignment with the rod 169 rearwardly through a housing 173 fixedly secured to the bed plate 148. As best seen in the showing of FIGURE 12, a compression spring 174 is disposed about the shaft 172 within the housing 173 with the rear end of the spring in abutment with the rear wall of the housing, and with the forward end of the spring in abutment with a shaft centering disc 175 adjustably positionable along the length of the shaft 172 and lockable thereto as by means of the locking screw 176. The disc 175 also of course is utilized to set the desired spring compression. The spring 174 is thus seen to urge the shaft 172 forward to move the stop pad 171 toward the rear surface of the gear 164. Engagement between the stop pad 171 and gear 164 is prevented by means of a stop 177 secured to the shaft 172 at the rear end thereof as by means of the locking screw 178. Abutment of the stop 177 with the rear end of the housing 173 terminates the forward motion of the stop pad 171 just short of engagement with the gear 164. This prevents the stop pad from moving forward during the interval when the forks 161 and 162 are being rotated to interchange positions.

None of the elements 171 through 178 are a part of a standard peeling and coring machine, but constitute a modification of such machines according to the present invention to enable the centering finger to cooperate with the spinning head 52 for purposes of transferring an apple from the conveyor 51. In this regard, the centering finger rod 169 is made somewhat longer than the standard length of such a rod in the usual Boutell type of machine. In fact in the usual apple peeling and coring machine the rod 169 is not a centering device at all but is merely used to remove the apple core from the fork tines, this being done in the following way.

Assuming that an apple has been loaded by hand onto the tines of the fork 162, as for example illustrated in the showing of FIGURE 26, it will be observed that the rod 169 has been pushed backward within the interior of the fork 162. The rod 169 in the usual machine exerts no resistance to the impaling of the apple on the fork tines because in the normal machine there is no such structure as that of the stop pad 171 and its associated elements. The rod 169 therefore is merely displaced somewhat rearwardly through the end of the gear 164. With the apple so loaded upon the fork 162, the forks 161 and 162 are interchanged in position so that an apple may be loaded upon the fork 161 while the apple which has already been impaled upon the fork 162 is peeled and cored.

As best seen in FIGURE 12, the peeler-corer 53 is provided with a coring knife 179 which is axially shiftable toward the particular fork then aligned therewith, and a peeler blade 180 engageable with the surface of the apple and movable in an arc thereabout. As best seen in FIGURES 20 and 21, when a fork is moved into the position occupied by fork 161 in the figures it is observed that the gear 164 is brought into mesh with a gear 181 which is mounted upon a shaft extending rearwardly into driving engagement with the gearing structure 158. Therefore, when the gear 164 engages the gear 181 the fork upon which the apple is held is immediately placed in rapid rotation to thereby rotate the apple. Other portions of the gearing structure 158 cause the coring knife 179 to move inward axially into the apple and core the same as the apple rotates about the knife 179. Similarly, the gearing structure 158 causes the peeler knife 180 to be moved about the surface of the apple while the latter is rotating and to thereby peel the same. As soon as the peeling has been completed, the coring knife 179 retracts and carries with it the peeled and cored apple which is then dropped off of the knife 179 while the apple core remains held by the tines of the fork, as for example shown in FIGURE 21 as 182.

As best seen in FIGURE 20, the rearwardly shifted end of the rod 169 is disposed immediately adjacent to the end of cam surface 183, and as the forks 161 and 162 are again rotated to interchange their position it will be appreciated that the rod 169 is moved forward through its fork by the action of the cam surface 183 with which the rear end of the rod 169 is engaged. This forces the apple core 182 off of the fork tines and into a receptacle so that it is ready to receive a new apple. From the foregoing it will be appreciated that the rod 169 in the normal Boutell type of peeler-corer machine serves only as a device for removing the core from the fork so that a new apple may be affixed thereupon, and in no sense serves the additional function of properly positioning the apple upon the fork tines as in the present apparatus to insure coincidence of the fork axis with the stem-blossom axis of the apple.

From FIGURES 23 through 26 it will now be understood that an apple is picked up from the conveyor 51 by the spinning head 52 and centering finger rod 169 in the following way. As appears from FIGURE 23, it will be observed that the apple carried by the carrier block 89 of the conveyor may have been only roughly aligned by the orientor 50 with its blossom-stem axis 184 still somewhat skewed with respect to the axis of the tines of the fork 162, in consequence of which transfer of the apple to the fork with its illustrated orientation would not result in proper coring of the apple, but would in fact cause the coring knife 179 to incompletely core the apple because of the skewed orientation of the axis 184. It also will be observed in FIGURE 23 that the cylindrical rod 123 of the spinning head and the rounded nib 170 of the centering finger are in retracted positions substantially removed from the apple itself. This condition of the apparatus corresponds to the cam orientations shown in FIGURE 27 in which the cam 63 has caused the spinning head 52 to be retracted and is just beginning to move forward toward the apple; the conveyor carrier block support shoe 118 is in its up position as shown by the cam 62; the conveyor has just moved forward to place the apple between the spinning head 52 and centering finger and has come to rest in that position as determined by cam 61; and the peeler-corer carriage 53 has been moving forward to move the centering finger nib 170 toward the apple. The previously mentioned retraction of the spinning head, which occurs after impalement of each apple onto the fork of the peeler-corer, is sufficient and so timed as to allow the jostling pin 90 of the carrier block freed of its apple to shift past the retracted spinning head 52. It will be noted in this connection that while the travel of the spinning head rod 123 is such that in its fully extended position it would be engaged by the jostling pin of the apple-carrying block, and so of necessity requires to be retracted as described, in the case of the centering rod its travel is never such as to intersect the path of movement of the jostling pins.

FIGURES 24 and 28 illustrate the conditions a short time later wherein it is observed that the centering head and centering finger have moved much closer to the apple but have not yet engaged the same. FIGURES 25 and 29 illustrate the conditions at yet a later instant when the spinning head nose 124 and the centering finger nib 170 have engaged the apple and by moving into the stem and blossom recesses respectively have corrected the skew orientation of the core to bring it into perfect alignment. The axial spinning of the spinning head rod 123 and flange 146 allows the tapered nose 124 to work into the apple recess before rotatably grasping the apple. As seen from the positions of the cams 61 and 62 in FIGURE 29 it is clear that the carrier block support shoe 118 is still in its up position and that the conveyor is remaining motionless.

The dashed line showing of FIGURE 26 and the cam positions of FIGURE 30 illustrate the conditions an instant later when there has been complete engagement of the spinning head nose 124 and centering finger nib 170 with the apple, and that the carrier block 89 support shoe 118 has dropped to lower the carrier block and disengage it from the apple which is now held in perfect alignment by the spinning head and centering finger. The solid line showing of FIGURE 26 and the cam positions of FIGURE 31 illustrate the maintenance of the conditions of FIGURE 30 except for the rapid extension of the shaft 23 of spinning head 52 which causes the apple to be impaled upon the tines of the fork 162 in the exact orientation that is desired. The change in the cam positions from those of FIGURE 31 to those illustrated in FIGURE 32 illustrates the conditions immediately after those shown in the solid line showing of FIGURE 26 and immediately prior to the conditions of FIGURE 23 in which the shaft 123 of the spinning head is quickly retracted, as is the peeler-corer carriage, and the conveyor 51 is in the process of shifting the next carrier block 89 into position between the spinning head and centering finger.

Recalling from FIGURES 23, 24 and 25 that the tapered nose 124 and nib 170 engage the apple from opposite ends it will be appreciated that while the apple must be engaged firmly it is necessary that a certain amount of resilient action be present in order to allow the apple to properly orient itself relative to the tapered nose 124 and centering finger rod 169. The resilient action of the centering finger is provided by the aforedescribed structure shown in FIGURE 12 involving the stop pad 171 and its associated structure. When the rounded nib 170 of the centering finger strikes the apple, the peeler-corer carriage has not yet come completely to rest so that the rod 169 is forced backward through the fork 162 and against the spring loaded stop pad 171. This resilient action helps to prevent impaling of the apple upon the centering finger or any tendency for the apple to be knocked off of the carrier block 89.

Similarly, from FIGURES 3 and 19 it will be appreciated that the inward shifting of the cylindrical rod 123 of the spinning head corresponds to the downward motion of the tie rod 138 and that this motion of the tie rod is resiliently transmitted to the block 137 and eventually to the rod 123 through the medium of the compression coil spring 139. When the tapered nose 124 engages the apple, it is therefore possible for the tie rod 138 to continue downward for a short distance without driving the tapered nose 124 into the apple by virtue of this resilient connection. These resilient couplings also accommodate for some variation in apple sizes. When it is desired to shift the apple onto the fork tines by suddenly extending the rod 123, this is brought about by the continued downward motion of the tie rod 138 which brings the lower end of sleeve 141 against the upper surface of the block 137 to terminate the resilient connection between the tie rod and the shiftable rod 123 and to thereafter positively drive the rod 123 horizontally to transfer the apple to the fork tines. Peeling and coring is then carried out in the manner previously described.

From the foregoing description of the apparatus illustrated in the drawings it will be appreciated that our invention fully accomplishes all of the objects earlier set forth herein, and that while we have described our invention in connection with a particularly illustrated embodiment thereof it will be appreciated that modifications and variations of the same may now occur from time to time to those persons normally skilled in the art without departing from the essential scope or spirit of our invention, and accordingly it is intended to claim the same broadly as well as specifically as indicated by the appended claims.

What is claimed as new and useful is:

1. An orienting conveyor device having an input end into which randomly oriented apples from a supply source are loaded and an output end at which apples are delivered in a particularly oriented position, comprising in combination, an orienting device adapted to be supplied with randomly oriented apples including aperture defining means which define an aperture of such size and shape that an apple may pass by gravity downward therethrough only when oriented in the desired position and also including apple turning means effective to rotate each apple into the said desired position, a conveying device disposed beneath the aperture formed by said aperture defining means of said orienting device including carrier means for receiving and holding in proper position all of the apples passing downward thereto through the said aperture and drive means coupled to said carrier means for moving the latter to the output end of the orienting conveyor device.

2. The apparatus according to claim 1 wherein the said aperture defining means is also the said apple turning means and comprises a pair of spaced apart cylindrical rollers with the ends thereof disposed proximate to one another in substantially horizontal alignment and having the cylindrical axes disposed divergingly substantially in a common plane so that the aperture between the rollers gradually increases in width from one end of the roller pair to the other end of the roller pair.

3. The apparatus according to claim 1 wherein the said aperture defining means is also the said apple turning means and comprises a pair of spaced apart tapered rollers with the ends thereof disposed proximate to one another in substantially horizontal alignment and having their axes disposed in parallel relation substantially in a common plane so that the aperture between the rollers gradually increases in width from one end of the roller pair to the other end of the roller pair.

4. The apparatus according to claim 1 wherein said carrier means includes a plurality of apple carriers connected together in an endless chain and supported for movement on a track structure located beneath said orienting device.

5. The apparatus according to claim 1 wherein said carrier means includes a plurality of apple carriers connected together in an endless chain and supported for movement on a track structure located beneath said orienting device and said drive means includes a driven sprocket engageable with sprocket receiving formations provided on each of said apple carriers to thereby engage successive ones of said carriers and advance the entire carrier means.

6. An orienting conveyor device having an input end into which randomly oriented apples from a supply source are loaded and an output end at which apples are delivered in a particularly oriented position, comprising in combination, (a) an orienting device adapted to be supplied with randomly oriented apples including (1) a pair of laterally spaced rollers with the ends thereof disposed proximate to one another in substantially horizontal alignment and having their axes disposed in a common plane so that the space between the rollers gradually increases in width from one end of the roller pair to the other end of the roller pair, (2) actuatable means coupled to said rollers for rotating the latter in the same sense but at different rates of speed so that an apple placed upon the rollers is subjected to a net upwardly directed peripheral force relative to the apple center, (b) a conveying device disposed beneath the space between the rollers of said orienting device for receiving and holding in proper position all of the apples passing downward thereto between said rollers including (1) a plurality of apple carriers connected together in an endless chain and supported for movement on an underlying track structure, (2) drive means engageable with successive portions of said endless chain of apple carriers and effective to move each carrier in turn to the output end of the orienting conveyor device.

7. The apparatus according to claim 6 having means coupled to said rollers for selectively adjusting the horizontal distance between the rollers at each end of the roller pair so that an apple may pass downward between and below the rollers when the stem-blossom axis is substantially orthogonal to the axes of the rollers.

8. The apparatus according to claim 6 having means coupled to said rollers for selectively vertically adjusting the relative elevations of the opposite ends of the roller pair.

9. The apparatus according to claim 6 wherein each of said apple carriers has secured thereto for motion therewith a segregating device projectable upward between the rollers of said orienting device effective to segregate one apple from the remainder thereof while the apple is in the process of being oriented to thereby cause that particular apple to be delivered to the carrier of the segregating device.

10. Apparatus for automatically delivering randomly oriented apples from a supply source to a peeling and coring machine in a particularly oriented position, comprising in combination, an orienting conveyor device having an input end into which randomly oriented apples are loaded and an output end at which properly oriented apples emerge, a transfer device at the output end of said orienting conveyor device operable to grasp the apples as they emerge and transfer the same from the orienting conveyor to the peeling and coring machine while maintaining the desired apple orientation until the apple transfer has been completed, said transfer device including means for grasping each apple by entering the stem and blossom recesses thereof from opposite ends of the apple stem-blossom axis, said orienting conveyer device including orienting means and conveying means, said orienting means being operable to cause randomly oriented apples fed thereto to assume a predetermined desired orientation and to then deliver the same to the said conveyor means, said conveyor means being operable to transport the oriented apples delivered thereto by said orienting means to said transfer device, drive means effective when actuated to render operable all of the aforesaid means and devices, and synchronizing means for coordinating the operations of said conveyor means and transfer device.

11. The apparatus according to claim 10 wherein said apple-grasping means of said transfer device includes a pair of colinear elements spaced apart along an axis which substantially coincides with the position of the stem-blossom axis of an apple delivered to the transfer device by the said orienting conveyor device, operating means coupled to said colinear elements and actuated by the aforesaid drive means and synchronizing means in a transfer cycle which first causes said colinear elements to move toward one another until they firmly engage the apple from opposite ends by respectively entering the stem and blossom recesses thereof and then causes said colinear elements to simultaneously shift axially in the same direction and impale the apple on a set of fork tines which form part of the said peeling and coring machine to thereby complete the apple transfer, said colinear elements being then shifted axially in opposite directions from one another to complete the operating cycle of the transfer device.

12. The apparatus according to claim 11 wherein said pair of colinear elements operating means includes resilient means which permit firm engagement of said colinear elements with the apple without causing the latter to be impaled thereon.

13. The apparatus according to claim 11 wherein one of said pair of colinear elements extends parallel to and between the fork tines of the peeling and coring machine and has its apple engaging end biased forward of the points of the tines by the said operating means coupled thereto, the other of said pair of colinear elements being a driving element axially shiftable by the said operating means coupled thereto to overcome the forward bias on the aforesaid one of said pair of colinear elements to drive the latter rearward past the fork tines and thereby impale the apple on the fork with the tines extending substantially parallel to the stem-blossom axis.

14. The apparatus according to claim 13 wherein the said operating means which biases the apple engaging end of the said one of the pair of colinear elements forward of the fork tines includes a spring-loaded plunger resiliently rectilinearly shiftable between limits through a housing carried by said peeling and coring machine along an axis coaxial with that of the said colinear element which it biases.

15. The apparatus according to claim 13 wherein the operating means coupled to the said driving element of the pair of colinear elements further includes means for spinning said driving element about its axis to thereby facilitate centering of the apple engaging end thereof in the apple recess which it engages.

16. The apparatus according to claim 13 wherein the operating means coupled to the said driving element of the pair of colinear elements further includes means for spinning said driving element about its axis to thereby facilitate centering of the apple engaging end thereof in the apple recess which it engages and wherein the apple-engaging end of said driving element includes a plurality of contiguous angularly related surfaces which act upon the apple to bring its stem-blossom axis in axial coincidence with the axis of rotation of said driving element.

17. Apparatus for automatically delivering randomly oriented apples from a supply source to a peeling and coring machine in a particularly oriented position, comprising in combination, (a) an orienting conveyor having an input end into which randomly oriented apples are loaded and an output end at which properly oriented apples emerge, comprising (1) an orienting device adapted to be supplied with randomly oriented apples including aperture defining means which define an aperture of such size and shape that an apple may pass by gravity downward therethrough only when oriented in the desired position and also including apple turning means effective to rotate each apple into the said desired position, (2) a conveying device disposed beneath the aperture formed by said aperture defining means of said orienting device including carrier means for receiving and holding in proper position all of the apples passing downward thereto through the said aperture and also including means coupled to said carrier means for moving the latter to the output end of the orienting conveyor to transport the oriented apples to a transfer device, (b) a transfer device at the output end of said orienting conveyor device operable to grasp the apples as they emerge and transfer the same to a peeling and coring machine while maintaining the desired apple orientation until the transfer has been completed, (c) means for disengaging each apple from said conveying device when the same has been grasped by said transfer device, (d) drive means effective when actuated to render operable all of the aforesaid means and devices, and (e) synchronizing means for coordinating the operations of said orienting conveyor and said transfer device and said disengaging means.

18. The apparatus according to claim 17 wherein said means for disengaging each apple from said conveying device when the same has been grasped by said transfer device includes a shiftable support shoe which underlies the said carrier means, said support shoe being shifted downward by said drive and synchronizing means to lower the said carrier means out of contact with the apple.

19. The apparatus according to claim 17 wherein said means for moving said carrier means includes drivable stepping means operable to successively move individual apples to the transfer device and pause for a predetermined time interval while the apple is transferred from the carrier means to a peeling and coring machine.

20. A transfer device for grasping particularly oriented apples successively presented thereto by a conveying device and transferring the apples to the peeling and coring machine for processing, comprising in combination, a pair of colinear elements spaced apart along an axis which substantially coincides with the position of the stem-blossom axis of an apple presented to the transfer device by the conveying device, operating means coupled to said colinear elements effective when actuated to operate the latter in a transfer cycle which causes said colinear elements to (a) move toward one another until they firmly engage the apple from opposite ends by respectively entering the stem and blossom recesses thereof, (b) then shifts simultaneously axially in the same direction and impales the apple on a set of fork tines which form part of the said peeling and coring machine, and (c) then shift axially in opposite directions from one another to complete the cyle.

21. The apparatus according to claim 20 wherein the said operating means which biases the apple engaging end of the said one of the pair of colinear elements forward of the fork tines includes a spring-loaded plunger resiliently rectilinearly shiftable between limits through a housing carried by said peeling and coring machine along an axis coaxial with that of the said colinear element which it biases.

22. The apparatus according to claim 20 wherein the operating means coupled to the said driving element of the pair of colinear elements further includes means for spinning said driving element about its axis to thereby facilitate centering of the apple engaging end thereof in the apple recess which it engages.

References Cited by the Examiner
UNITED STATES PATENTS

| 1,711,051 | 4/29 | Gates. | |
|---|---|---|---|
| 1,832,035 | 11/31 | Leib | 209—107 |
| 2,572,773 | 10/51 | Slagle. | |
| 2,793,734 | 5/57 | Lorenzen. | |
| 2,909,270 | 10/59 | Hait. | |
| 2,933,174 | 4/60 | Hait. | |

FOREIGN PATENTS

| 208,867 | 1/24 | Great Britain. |
|---|---|---|
| 250,402 | 6/48 | Switzerland. |

SAMUEL F. COLEMAN, *Primary Examiner*.
ERNEST A. FALLER, Jr., EDWARD A. SROKA,
*Examiners.*